ABSTRACT OF THE DISCLOSURE 3,654,083
PREPARATION OF STABLE, WATER-SOLUBLE ENZYME CONJUGATES
Huibert Cornelis Theus Moelker, Oss, Netherlands, assignor to Organon Inc., Orange, N.J.
No Drawing. Filed Aug. 1, 1969, Ser. No. 846,951
Claims priority, application Netherlands, Aug. 31, 1968, 6812443
Int. Cl. C07g 7/02; C12k 1/00
U.S. Cl. 195—63                     11 Claims

ABSTRACT OF THE DISCLOSURE

The invention relates to the preparation of new and stable water-soluble enzyme conjugates. They can be obtained by the formation of covalent bonds between the enzyme and a compound containing reactive groups in the presence of one or more amino acids or peptides or mixtures thereof. These soluble conjugates are obtained in a high yield of activity and exhibit a good stability against thermic denaturation. Further they are stable in a pH range which is wider than that of the original enzyme.

BACKGROUND OF THE INVENTION

It is known to couple enzymes to insoluble polymers by covalent bonds to obtain insoluble enzyme conjugates. In a survey in Ann. Rev. Biochemistry 35 (II), 873 (1966) I. Silman and E. Katchalski describe the preparation of these enzyme conjugates. Sometimes water-soluble polymers are used as carriers which are cross-linked by means of bi-functional reagents so that ultimately insoluble enzyme derivatives are obtained again. A well-known example thereof is the coupling of trypsin with the copolymer of ethylene maleic acid anhydride and the cross-linking of the coupling product with hexamethylene diamine, described by E. Katchalski in Biochemistry 3, 1905 (1964).

Enzymes modified in this way are of importance if one wants to use one and the same enzyme preparation for several enzymatic conversions, for after the conversion the insoluble enzyme derivative can be separated from the reaction mixture and used for the next conversion. Enzymes modified to insoluble conjugates are more stable than unmodified enzymes. This modification is especially important if relatively costly enzymes are applied.

In many cases, however, it is desirable to use soluble enzyme conjugates. Textile, for instance, will not be desized to any extent by an insoluble α-amylase because on a solid carrier, say cotton, the substrate, say starch, cannot react with the insoluble enzyme or only in a slight degree. Moreover enzymes affixed to a solid carrier have but a very slow conversion rate as compared with enzymes in solution. Nor will insoluble protease produce much effect in the removal of protein stains from textile fibres. Furthermore the soluble, stable form will often be preferred to the insoluble form for the therapeutic and cosmetic purposes.

Further it is known to obtain soluble enzyme conjugates by cross-linking.

In Biopolymers 5, 577–582 (1967) R. P. Patel et al. describe the preparation of water-soluble conjugates of chymotrypsin with polyacrylic acid, polyglutamic acid and carboxymethylcellulose (CMC). The cross-linking with the two first-mentioned polymers is performed by means of Woodward's reagent K, the CMC being applied in the form of its azide. In a few cases only could the yield of activity obtained by the coupling be called sufficient. The degree of cross-linking was very low. About the stability of the separate conjugates no data are available.

SUMMARY OF THE INVENTION

A process has now been found for the preparation of stable, water-soluble enzyme conjugates by forming covalent bonds with compounds containing several reactive groups, characterized in that an enzyme and a protein hydrolysate are reacted together with these reactive compounds to obtain soluble conjugates with a much higher yield of activity as compared with the known methods. These conjugates exhibit a good stability against thermic denaturation. Further they are stable in a pH-range which is wider than that of the original enzyme, both on the acid and on the basic side. Furthermore it has been found that these enzymes are especially proof against the action of detergents. All these properties render the present conjugates very suitable for use in laundering agents and in liquid compositions for cleaning surfaces and for pharmaceutical and cosmetic preparations such as ointments and lotions.

By the term protein hydrolysate is meant one or more amino acids or peptides, or mixtures thereof. The latter can be obtained, for example, by hydrolysing proteins. This hydrolysis can be performed by any conventional method, e.g. with an acid or an enzyme.

As proteins the following substances qualify particularly: casein, serum albumin, lactoglobulin, egg albumin, fibroin, myosin, keratin, collagen, gelatin, soya proteins and crude protein mixtures.

The protein hydrolysate has an enzyme-protecting action in the process of cross-linking, the mechanism of which is still unknown. In the enzyme conjugates in question, which have a considerable content of peptides or amino acids, the latter substances prove to have a favourable influence on the preservation of the enzyme structure, particularly the so-called tertiary and quaternary structures as described in, for example, Angew. Chem. 78, 217 (1966). The destruction of these structures is termed denaturation. It occurs easily, for example, at elevated temperatures and by the action of chemical substances such as detergents, oxidants and strong acid and basic mediums. Since the activity is greatly dependent on the preservation of these structures it is supposed that in the conjugates in question the peptides and amino acids fix these structures firmly. In the conjugates according to the invention the presence of the protein hydrolysate does not on any account affect the enzyme activity adversely.

The compound with which the enzyme and the protein hydrolysate are cross-linked should preferably be a water-soluble, reactive polymer, which can be formed from a reactive monomer or a non-reactive polymer activated in a conventional manner. It is also possible, however, to use other bi-functional compounds such as aldehydes, dialdehydes, unsaturated aldehydes and halogenated carboxylic acid esters and ethers. The most suitable soluble cross-linking agents are: polyacrylic acid, activated with, for example N-ethyl - 5 - phenyl-isoxazolium-3'-sulphonate (Woodard's reagent K), the azide of carboxymethylcellulose, ethylene maleic acid anhydride, polyglutamic acid, activated with Woodard's reagent K, formaldehyde, thioformaldehyde, dextrans substituted with isothiocyanic groups, dimethyl adipic acid derivatives, glutaric aldehyde, carbodiimides and phenol-2,4-disulfonyl chloride, cyanogenbromide, polysaccharides activated by cyanogenbromide, crotonaldehyde, acroleïn and chloroformic esters, or a mixture of these agents.

The cross-linking reaction is performed at a pH of from about 4 to 10.5, dependent upon the enzyme and the reagent applied, but it is preferred to employ a pH of from 5 to 8. The reaction sets in already just above freezing-point, for example at 4° C., but then it is of such a long duration that, for for example, of from 20 to 48 hours are required for a proper cross-linking. Therefore the reaction is preferably performed at a higher temperature, but there should be no question of thermic denaturation of the enzyme.

The method according to the invention can be applied in the conjugation of many enzymes such as redoxases, for example, catalase, further hydrolases such as proteases, amylases, lipases, and also transferases, lyases, isomerases and ligases, or mixtures of these enzymes.

Further it has been found that the process according to hte invention yields products with a good stability if hydrolytic enzymes such as amylases, amyloglucosidases, esterases, lipases, ribonucleases and proteases are used. The latter group was especially tested in laundering agents. Even detergents and oxidants do not denaturate the enzyme conjugates of a microbial protease from a Bacillus and a protein hydrolysate prepared by this method very much at a temperature of about 60° C.

Hydrolysates obtained by the action of the protease to be stabilized itself, especially casein hydrolysates prepared in this manner, are very useful in the conjugation of proteases with these hydrolysates. The combination of glutaric aldehyde as cross-linking agent, and casein hydrolysate as protective agent, has proved to be extremely useful in the preparation of protease conjugates.

Dependent upon the nature of the enzyme, the cross-linking agent and the protein hydrolysate different ratios of mixture are applied. In conjugates composed of protease, casein hydrolysate and glutaric aldehyde the weight ratio between protease and glutaric aldehyde is preferably between (1–5):(5–1), the part of weight of hydrolysate being of the same magnitude as that of the cross-linking agent. Preferably the ratio between the quantities of enzyme, protein hydrolysate and glutaric aldehyde is about 2:1:1.

DESCRIPTION OF THE PREFERRED EMBODIMENTS

The invention is illustrated further by the following examples, to which it is by no means limited, however.

Example 1

Of a microbial protease 0.5 gm. was dissolved in 75 ml. 0.05 M phosphate buffer of pH 6.5. To this solution was added 25 ml. of a suspension of 1 gm. ethylene maleic acid anhydride (E.M.A., grade 11, Monsanto) in water. The suspension was stirred for 16 hours at 5° C. and then dialysed. Then an insoluble residue was separated from the suspension by centrifugation, after which the suspension was lyophilised to obtain 1.13 gm. soluble final product. In an identical manner a soluble enzyme conjugate was prepared except that the cross-linking took place after the addition of 1 gm. albumin hydrolysate. The suspension was dialysed and lyophilised to obtain 1.4 gm. soluble enzyme derivative.

The table given below shows the yield of activity and the stability of the two enzyme conjugates and a comparison with the stability properties of the original enzyme.

The proteolytic activity was determined spectrophotometrically at 280 mm. by measuring the absorbance of the peptides, which are soluble in trichloro acetic acid, after hydrolysis of casein, as described by M. Kunitz in J. Gen. Physiol. 30, 291 (1947). Incubation time: 30 minutes at 35° C. and at pH 8.0.

According to the invention a soluble enzyme conjugate is obtained with a much better stability as compared with a conjugate prepared without albumin hydrolysate and the product is obtained in a much higher yield. We point out the higher stability of the conjugate according to the invention as compared with perborate-containing detergents.

Example 2

100 mg. of a purified bovine chymotrypsin were dissolved in 10 ml. 0.2 M sodiumacetate buffer of pH 4.5. To this solution was added 2 ml. of an 8% solution of casein hydrolysate. The casein hydrolysate was prepared by hydrolysing a solution of 4% casein with a bacterial protease for 20 hours at 35° C. and pH 9.0. After hydrolysis the product obtained was heated for 5 minutes at 100° C. in order to destroy the proteolytic activity and then lyophilized.

To the obtained solution 200 mg. glutaric aldehyde (as a 25% solution) were added whilst stirring at room temperature. After 30 minutes the reaction mixture was cooled to 4° C. and dialysed at this temperature against distilled water and lyophilized.

In the same way an enzyme conjugate was prepared without casein-hydrolysate during the reaction. The properties of the enzyme conjugate are shown in the table below.

|  | Before cross-linking, percent | After cross-linking | |
|---|---|---|---|
|  |  | Without casein hydrolysate, percent | With casein hydrolysate, percent |
| Yield of activity | (100) | <2 | 12 |
| Residual activity after 30' heating at 50° C. in 0.1 M phosphate buffer pH 7.8 | 25 | Undeterminable | 74 |

The activity of chymotrypsin was determined at pH 7.8 and 30° C. by continuous titration of the acid formed after hydrolysis of N-benzoyltyrosin ethylester.

Example 3

80 mg. cyanogenbromide dissolved in 5 ml. distilled water were added to a solution of 200 mg. of a bacterial protease in 0.5 M phosphate buffer of pH 8.0 whilst stirring at 20° C.

In a second experiment 1.25 ml. of an 8% caseinhydrolysate solution, prepared as described in Example 2, was added to the same reaction mixture.

After 20 hours reaction time the reaction mixtures were dialysed and lyophilized. The yield and stability of the enzyme conjugates obtained are shown in Column 5.

|  | Before cross-linking | After cross-linking | |
|---|---|---|---|
|  |  | Without albumin hydrolysate | With albumin hydrolysate |
| Activity (U/mg.) | 0.46 | 0.07 | 0.20 |
| Yield of activity, percent | (100) | 35 | 98 |
| Residual activity after 60 minutes heating at 60° C. in 0.1 M TRIS-buffer of pH 9.0, percent | 28 | 40 | 65 |
| Residual activity after 60 minutes heating at 60° C. in 0.4% of a solution of a laundering agent composition at pH 8.7, percent [1] | <10 | 42 | 62 |
| Residual activity after 15 minutes heating at 60° C. in 0.4% of a perborate-containing laundering agent composition at pH 8.7, percent [2] | <10 | 38 | 76 |

[1] Composition of the laundering agent: 30% sodium tripolyphosphate, 30% sodium sulphate, 25% sodium carbonate, 5% sodium dodecyl benzenesulphonate, 5% polyglycolether, 5% carboxymethylcellulose, optical white, etc.
[2] Composition of the perborate-containing laundering agent: 28% sodium tripolyphosphate, 17% sodium sulphate, 6% anionic detergent, 4% nonionic detergent, 22% sodium perborate, 16% of a soil suspending agent (CMC and the like), 7% moisture.

|  | Before cross-linking, percent | After cross-linking | |
|---|---|---|---|
|  |  | Without casein hydrolysate, percent | With casein hydrolysate, percent |
| Yield of activity | (100) | 8 | 21 |
| Residual activity after 20' heating at 60° C. in 0.1 M TRIS-buffer pH 8.0 | 14 | 69 | 87 |
| Idem after 20' heating at 60° C. in 0.4% of a laundering agent composition (see Ex. 1) at pH 8.0 | 9 | 30 | 30 |

Example 4

In this example the reactive product from a mixture of cyanogenbromide and dextran obtained in the following way was used as a polyfunctional reactive compound.

400 mg. dextran (molecular weight about 10.000) were dissolved in 20 ml. distilled water. To this solution 80 mg. cyanogenbromide was added. During the reaction the pH was kept at 11.0–11.5 by continuous addition of 1 N sodiumhydroxyde. After 10 minutes reaction the obtained reactive dextran derivative was added to 200 mg. of a bacterial protease dissolved in 5 ml. 0.5 M phosphate buffer of pH 8.0 whilst stirring.

In two parallel experiments 1.25 ml. 8% caseinhydrolysate and 1.0 ml. 4% glycine solution respectively were added previously to the protease solution. After 20 hours reaction time at room temperature the solutions were dialysed and lyophilized. The results are given in the next table.

|  | Before cross-linking, percent | After cross-linking | | |
|---|---|---|---|---|
|  |  | Without any addition, percent | With casein hydrolysate, percent | With glycine, percent |
| Yield of activity | (100) | 79 | 120 | 98 |
| Residual activity after 20' heating at 60° C. in 0.1 M TRIS-buffer pH 8.0 | 14 | 26 | 25 | 24 |
| Idem in 0.4% of a laundering agent composition (see Ex. 1) at pH 8.0 | 9 | 16 | 16 | 15 |

Example 5

Of a microbial protease 0.5 gm. were dissolved in 75 ml. 0.5 M phosphate buffer of pH 6.5. To this solution were added 25 ml. of a solution containing 0.125 gm. glutaric aldehyde.

In a second experiment previously 0.25 gm. glutamic acid was added to the protease solution.

Both solutions were stirred for 16 hours at 5° C. and then dialysed. An insoluble residue was removed by centrifugation and the supernatant was lyophilized to obtain respectively 0.72 and 0.75 gm. dialysed and lyophilized enzyme conjugates.

A comparison is given in the next table.

|  | Before cross-linking, percent | After cross-linking | |
|---|---|---|---|
|  |  | Without glutamic acid, percent | With glutamic acid, percent |
| Yield of activity | (100) | <3 | 30 |
| Residual activity after 60' heating at 60° C. in 0.1 M TRIS pH 9.0 | 10 | Undeterminable | 50 |
| Idem after 30' heating at 60° C. in 0.4% of a laundering agent composition (see Ex. 1) at at pH 9.0 | <10 | Undeterminable | 60 |

Example 6

Of a purified amyloglucosidase preparation (24 U/mg.) 250 mg. were dissolved in 20 ml. 0.1 M TRIS-buffer at pH 8.0. To this solution was added 12.5 ml. of an 8% casein hydrolysate solution in 0.1 M TRIS-buffer of pH 8.0. The casein hydrolysate was prepared by hydrolysing casein enzymatically at pH 8.0 by means of a microbial protease.

To the solution obtained was added 0.5 gm. CMC-azide dissolved in 40 ml. 0.1 M TRIS-buffer of pH 8.0. The soluble CMC-azide was prepared conform Nature 189, 576 (1962). The solution was stirred at room temperature for 16 hours. Then the preparation obtained was dialysed and lyophilized to obtain 1.60 gm. dry product with an activity of 3.75 U/mg.

In the same manner a preparation was prepared without casein hydrolysate. Instead of this hydrolysate 12.5 ml. 0.1 M TRIS-buffer of pH 8.0 was used. Yield: 0.59 gm. dry product with an activity of 9.15 U/mg.

The activity of the amyloglucosidase preparations was measured by spectrophotometric determination of the quantity of glucose released in the hydrolysis of soluble starch, after colouring with o-toluidin (K. Dubowski, J. Clin. Chem. 8, 215 (1962)) at 635 nm. Incubation time: 15 minutes at 40° C. and at pH 4.5.

In the following table the yields of activity and the stability of the products obtained are compared with those of the starting material.

|  | Before cross-linking, percent | After cross-linking | |
|---|---|---|---|
|  |  | Without casein hydrolysate, percent | With casein hydrolysate, percent |
| Yield of activity | (100) | 90 | 100 |
| Residual activity after 15 minutes heating at 70° C. in 0.1 M sodium acetate buffer of pH 4.5 | 29 | 41 | 47 |

The improved stability of the amyloglucosidase conjugate also presents itself clearly on application of this preparation in the manufacture of dextrose from starch.

The fact is that it proved to be possible to reach the same hydrolysis degree (D. E. value) with a dose of enzyme conjugate prepared in accordance with this example and equal to that of non-cross-linked enzyme, but in a shorter time than with non-cross-linked enzyme, or in case of the same hydrolysis time a higher hydrolysis degree as explained hereinafter.

A 30% starch solution was pre-hydrolyzed with α-amylase to a D.E. value of about 12. Then the solution was hydrolysed further with various quantities of amyloglucosidase and amylglucosidase conjugate prepared in accordance wtih this example, at pH 4.0 and at 60° C. At the end of the hydrolysis the dextrose equivalent (D. E. value, i.e. the percentage of glucose formed of the maximum quantity of glucose obtainable theoretically) was determined by measuring the glucose content in accordance with Somogyi-Nelson, described in J. Biol. Chem. 195, 19 (1952).

|  | D.E. Value | |
|---|---|---|
|  | Amyloglucosidase | Amyloglucosidase conjugate |
| Dosage 2.5 U/gm. starch, hydrolysis time: 48 hours | 88.0 | 92.1 |
| Dosage 2.5 U/gm. starch, hydrolysis time: 60 hours | 93.8 | 96.0 |
| Dosage 2.5 U/gm. starch, hydrolysis time: 48 hours | 94.2 | 96.4 |
| Dosage 2.5 U/gm. starch, hydrolysis time: 60 hours | 96.2 | 96.6 |

Example 7

A solution of 200 mg. of a bacterial protease in 20 ml. 1 M TRIS-buffer of pH 8 with and without 204 mg. caseinhydrolysate was prepared.

There was also prepared a solution of 200 mg. of the bacterial protease cross-linked with 1000 mg. glutaraldehyde with and without 240 mg. caseinhydrolysate in 20 ml 1 M TRIS-buffer, maintaining the pH at 8.

The improved yield and stability resulting from the application of the invented method clearly follows from the following table.

|  | Before cross-linking | | After cross-linking | |
| --- | --- | --- | --- | --- |
|  | Without casein hydrolysate, percent | With casein hydrolysate, percent | Without casein hydrolysate, percent | With casein hydrolysate, percent |
| Yield of activity | (100) | 121 | 62 | 115 |
| Residual activity after standing at room temperature, $x$ days: | | | | |
| 3 | 28 | 52 | 37 | 79 |
| 12 | 17 | 38 | 33 | 74 |
| 18 | 13 | 28 | 25 | 64 |

EXAMPLE 8

In the same manner as described in Example 6 1 gm. of a commercial, crude mixture of glucose-oxidase and catalase were coupled by means of carboxymethylcellulose with and without albumin hydrolysate.

In the table given below the yield of activity and the stability properties of the enzyme conjugates obtained are compared. The glucose-oxydase activity is measured by titrimetric determination of the quantity of gluconic acid released after incubation of a glucose solution with glucose-oxydase for 15 minutes at pH 5.1 and at 35° C., as described by L. Underkofler in Proc. Int. Symp. Enzyme Chemistry, Tokyo and Kyoto, page 486 (1957).

The catalase activity was determined by following the decomposition of hydrogen peroxide spectrophotometrically at 240 nm. at pH 7.0 and at 25° C., as described by Beers and Sizer in J. Biol. Chem. 195, 133 (1952).

|  | Before cross-linking, percent | After cross-linking | |
| --- | --- | --- | --- |
|  |  | Without albumin hydrolysate, percent | With albumin hydrolysate, percent |
| Yield of activity glucose oxydase | (100) | 54 | 72 |
| Residual activity glucose-oxydase after 10 minutes heating at pH 4.5 and at 80° C | 22 | 51 | 55 |
| Yield of activity calatase | (100) | 62 | 8 |
| Residual activity catalase after 10 minutes heating at 80° C. and at pH 4.5 | 59 | 85 | 91 |

What is claimed is:

1. A stable, water-soluble enzyme conjugate comprising an enzyme and a protein hydrolysate, both covalently bonded to a cross-linking agent.
2. The enzyme conjugate of claim 1 in which the enzyme is a proteolytic enzyme and the protein hydrolysate is casein hydrolysate.
3. The enzyme conjugate of claim 1 in which the cross-linking agent is glutaraldehyde.
4. The enzyme conjugate of claim 3 in which the ratio between the enzyme, protein hydrolysate and glutaraldehyde is 2:1:1 by weight.
5. The enzyme conjugate of claim 1 in which the enzyme is a hydrolytic enzyme.
6. The enzyme conjugate of claim 1 in which the enzyme is a protease.
7. A stable, water-soluble enzyme conjugate consisting essentially of protease, casein hydrolysate, both covalently bonded to glutaraldehyde by cross-linking, the ratio between the protease, casein hydrolysate and glutaraldehyde being 2:1:1, by weight.
8. The method of preparation of a stable, water-soluble enzyme conjugate which comprises reacting an enzyme and a protein hydrolysate with a cross-linking agent whereby both the enzyme and the protein hydrolysate become covalently bonded to said cross-linking agent, to form a stable, water-soluble conjugate.
9. The method of claim 8 in which the enzyme is a protease.
10. The method of claim 8 in which the protein hydrolysate is casein hydrolysate.
11. The method of claim 8 in which the cross-linking agent is glutaraldehyde.

References Cited

UNITED STATES PATENTS

| 3,296,094 | 1/1967 | Cayle | 195—63 |
| 3,050,445 | 8/1962 | Damaskus et al. | 195—63 |

OTHER REFERENCES

Mitz et al., Synthesis of Biologically Active Cellulose Derivatives of Enzymes, Nature, vol. 189, 1961 ( pp. 576–577), QP1N2.

Habeeb, A.F.S.A., Chemical Abstracts, April 1969 (66297d) (p. 182), QD1.A51.

A. LOUIS MONACELL, Primary Examiner

D. M. NAFF, Assistant Examiner

U.S. Cl. X.R.

195—DIG. 11, 68